UNITED STATES PATENT OFFICE 2,463,861

PROCESS FOR THE PREPARATION OF A MELAMINYL-PHENYL-STIBONIC ACID COMPOUND

Ernst A. H. Friedheim, New York, N. Y.

No Drawing. Application February 7, 1946,
Serial No. 646,214

6 Claims. (Cl. 260—242)

This invention relates to the preparation of 1,3,5-triazinyl derivatives substituted at one carbon atom of the triazine ring by an aminophenyl group substituted by an antimony radical. It has particular relation to a process in which 2-chloro-4,6-diamino-1,3,5-triazine is reacted in aqueous medium with an aminophenyl compound substituted by an antimony radical.

The main object of my present invention is to provide a process which results in the formation of 1,3,5-triazine derivatives of the above mentioned type, in good yields, and permits recovery of such derivatives in pure condition by a simple procedure.

I have found that 1,3,5-triazinyl-amino-phenyl stibonic acids may be easily obtained by reacting 2-chloro-4,6-diamino-1,3,5-triazine with a water-soluble p-aminophenyl stibinate in aqueous medium in the presence of oxalic acid in the manner described in detail hereinafter. The reaction takes place according to the following scheme:

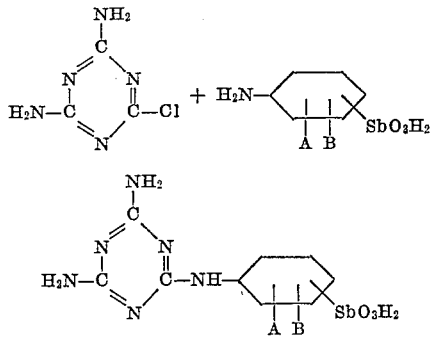

In the above formulas, A and B may stand for hydrogen or substituents of the benzene ring. Triazinyl compounds of the type obtained according to my present process are described in my copending application Ser. No. 506,564 filed October 16, 1943 now Patent No. 2,418,115.

*Example.*—One liter of water is heated to the boiling point in a glass beaker provided with a mechanical stirrer. Three milliliters of octyl alcohol and 31.1 grams (0.075 mol) of an aqueous 35% paste of 2-chloro-4,6-diamino-1,3,5-triazine are added to the boiling solution with rapid stirring, forming a heavy white suspension. 17.8 grams (0.05 mol) of p-sodium stibanilate (13.5% moisture) are then introduced to the boiling suspension, and 2 minutes after the addition of the 2-chloro-4,6-diamino triazine, 9.0 grams (0.1 mol) of anhydrous oxalic acid are added. Boiling and stirring are now continued for 5 minutes, after which heating is discontinued and 1 kg. of chopped ice is added to the reaction mixture to stop instantaneously all further reaction. In less than 1 minute the temperature drops to 10° C. The resulting granular precipitate is allowed to settle for one hour. About 70% of the water-clear mother liquor is then syphoned off and discarded. The product may be readily filtered, is sucked dry and washed with water until the washings are free from oxalic acid. The filtrate and washings are also discarded.

The wet filter cake is suspended with mechanical stirring in 1 liter of water. The pH is adjusted to 8–9 by the addition of 100 ml. of N/1 sodium hydroxide. The suspension is stirred for ½ hour, during which the pH drops to 8.0–8.5. The suspension is then treated with 5 g. of activated charcoal and filtered, and the residue is washed with 100 ml. of water. To the combined water-clear filtrate and washings, 420 ml. of 7.8 N aqueous sodium hydroxide solution (which makes the reaction mixture 2 N in NaOH) are added. A very small amount of amorphous material separates immediately and is removed by rapid filtration through a sintered glass funnel. The clear filtrate is allowed to stand at room temperature for several hours to permit slow crystallization of white needles of hydrated sodium salt of p-melaminyl-phenyl-stibonic acid. After standing at 5° C. for 15 hours, the product is filtered on glass, washed with N/1 aqueous sodium hydroxide, 95% ethyl alcohol and ether, and is dried in air at 75° C. for 5 minutes. The amount of the product obtained corresponds to 52% of the theory.

The process described in the above example may be carried out substantially in the same manner if, instead of a p-aminophenyl-stibonic acid, another, but similar, compound is used, for example 4-oxy-3-aminophenyl stibonic acid, 2-oxy-4-aminophenyl-stibonic acid, m-aminophenyl stibonic acid, or the like.

In the preferred embodiment of my invention, adjustment of the reaction mixture to a pH lower than 4, preferably of 2 to 3, addition of oxalic acid as the acidifying compound and carrying out of the reaction at a relatively high temperature, are used in order to obtain in good yield a product which can be easily purified. I have found that substitution of an inorganic acid, such as hydrochloric or sulfuric acid, for oxalic acid, results in low yields and is, therefore, not practical. The use of tartaric acid, instead of oxalic acid, results in satisfactory yields. However, the reaction product obtained in the presence of tartaric acid and other similar oxy-acids, is contaminated with these acids, and the removal of these acids would cause very considerable difficulties.

As to the reaction temperature, the reaction proceeds rapidly at boiling temperature, i. e. the reaction is complete in less than 5 minutes. At lower temperatures, for example at temperatures between 65° and 85° C., the reaction requires more time, but is satisfactory in any other respect. If time is no object, the reaction may even be run at lower temperatures.

In carrying out the reaction, I have found it advantageous to use an excess of the triazine compound and to react 1 mol of the aminophenyl-antimony compound with 1.2 to 2.0 mol of the 2-chloro-4,6-amino-1,3,5-triazine.

It will be understood that my invention is not limited to the above described steps and details and may be carried out with various modifications without departing from the spirit and scope of the invention as defined in the appended claims.

I claim:

1. A process for the preparation of a melaminyl-phenyl-stibonic acid compound, said process comprising reacting 2-chloro-4,6-diamino-1,3,5-triazine in aqueous reaction medium with an aminophenyl stibonic acid in the presence of oxalic acid and recovering the thus formed melaminyl stibonic acid.

2. A process for the preparation of a melaminyl-phenyl-stibonic acid compound, said process comprising reacting 2-chloro-4,6-diamino-1,3,5-triazine in aqueous reaction medium with an aminophenyl stibonic acid in the presence of oxalic acid at a pH of lower than 4 and recovering the thus formed melaminyl stibonic acid.

3. A process for the preparation of a melaminyl-phenyl-stibonic acid compound, said process comprising reacting 2-chloro-4,6-diamino-1,3,5-triazine in aqueous reaction medium with an aminophenyl stibonic acid in the presence of oxalic acid at a pH of 2 to 3 at an elevated temperature under atmospheric pressure and recovering the thus formed melaminyl stibonic acid.

4. A process for the preparation of a melaminyl-phenyl-stibonic acid compound, said process comprising reacting 2-chloro-4,6-diamino-1,3,5-triazine in aqueous reaction medium with an aminophenyl stibonic acid in the presence of oxalic acid at a pH of 2 to 3 under stirring at boiling temperature under atmospheric pressure and recovering the thus formed melaminyl stibonic acid.

5. A process for the preparation of a melaminyl-phenyl-stibonic acid compound, said process comprising reacting one mol of an aminophenyl stibonic acid in aqueous reaction medium with 1.0 to 2.0 mols of 2-chloro-4,6-diamino-1,3,5-triazine in the presence of oxalic acid at an elevated temperature under atmospheric pressure and recovering the thus formed melaminyl stibonic acid.

6. A process for the preparation of a melaminyl-phenyl-stibonic acid compound, said process comprising reacting one mol of p-sodium-aminophenyl stibonic acid with 1½ mol of 2-chloro-4,6-diamino-1,3,5-triazine in the presence of 2 mols of oxalic acid at a pH of 2-3 at a temperature between 50° C. and the boiling temperature under atmospheric pressure in aqueous reaction medium and recovering the thus formed melaminyl stibonic acid.

ERNST A. H. FRIEDHEIM.

REFERENCES CITED

The following references are of record in the file of this patent:

UNITED STATES PATENTS

| Number | Name | Date |
|---|---|---|
| 2,295,574 | Friedheim | Sept. 15, 1942 |